(12) United States Patent
Motai

(10) Patent No.: US 7,423,622 B2
(45) Date of Patent: Sep. 9, 2008

(54) DISPLAY DEVICE

(75) Inventor: Tomonobu Motai, Yokohama (JP)

(73) Assignee: Toshiba Matsushita Display Technology Co., Ltd., Tokyo-To (JP)

( * ) Notice: Subject to any disclaimer, the term of this patent is extended or adjusted under 35 U.S.C. 154(b) by 784 days.

(21) Appl. No.: 10/870,058

(22) Filed: Jun. 18, 2004

(65) Prior Publication Data
US 2005/0001804 A1    Jan. 6, 2005

(30) Foreign Application Priority Data
Jun. 20, 2003    (JP) .............................. 2003-176762

(51) Int. Cl.
G09G 3/36    (2006.01)
(52) U.S. Cl. .......................................... 345/98; 345/90
(58) Field of Classification Search .................. 345/87, 345/90, 92, 98, 100, 102, 204–207
See application file for complete search history.

(56) References Cited

U.S. PATENT DOCUMENTS

| | | | |
|---|---|---|---|
| 5,712,652 A * | 1/1998 | Sato et al. ...................... | 345/90 |
| 6,243,069 B1 * | 6/2001 | Ogawa et al. ................ | 345/102 |
| 6,424,326 B2 * | 7/2002 | Yamazaki et al. ............. | 345/77 |
| 6,873,320 B2 | 3/2005 | Nakamura | |
| 6,940,142 B2 * | 9/2005 | Street et al. .................. | 257/443 |
| 6,965,365 B2 | 11/2005 | Nakamura | |
| 2002/0041404 A1 * | 4/2002 | Shinotsuka et al. ......... | 358/514 |

FOREIGN PATENT DOCUMENTS

| | | |
|---|---|---|
| JP | 2002-196732 | 7/2002 |
| KR | 2002-0019416 | 3/2002 |

* cited by examiner

*Primary Examiner*—Ricardo L Osorio
(74) *Attorney, Agent, or Firm*—Oblon, Spivak, McClelland, Maier & Neustadt, P.C.

(57) ABSTRACT

A display device, comprising: signal lines and scanning lines arranged vertically and horizontally on an insulating substrate; display elements formed in vicinity of the signal lines and the scanning lines on said insulating substrate; a signal line drive circuit which drives the signal lines; and a scanning line drive circuit which drives the scanning lines, wherein said signal line drive circuit includes: a display data storage implemented on said insulating substrate, which stores ordinary display data supplied from outside; and a signal driver formed of polysilicon process on said insulating substrate, which drives the signal lines based on the ordinary display data stored in said display data storage.

7 Claims, 11 Drawing Sheets

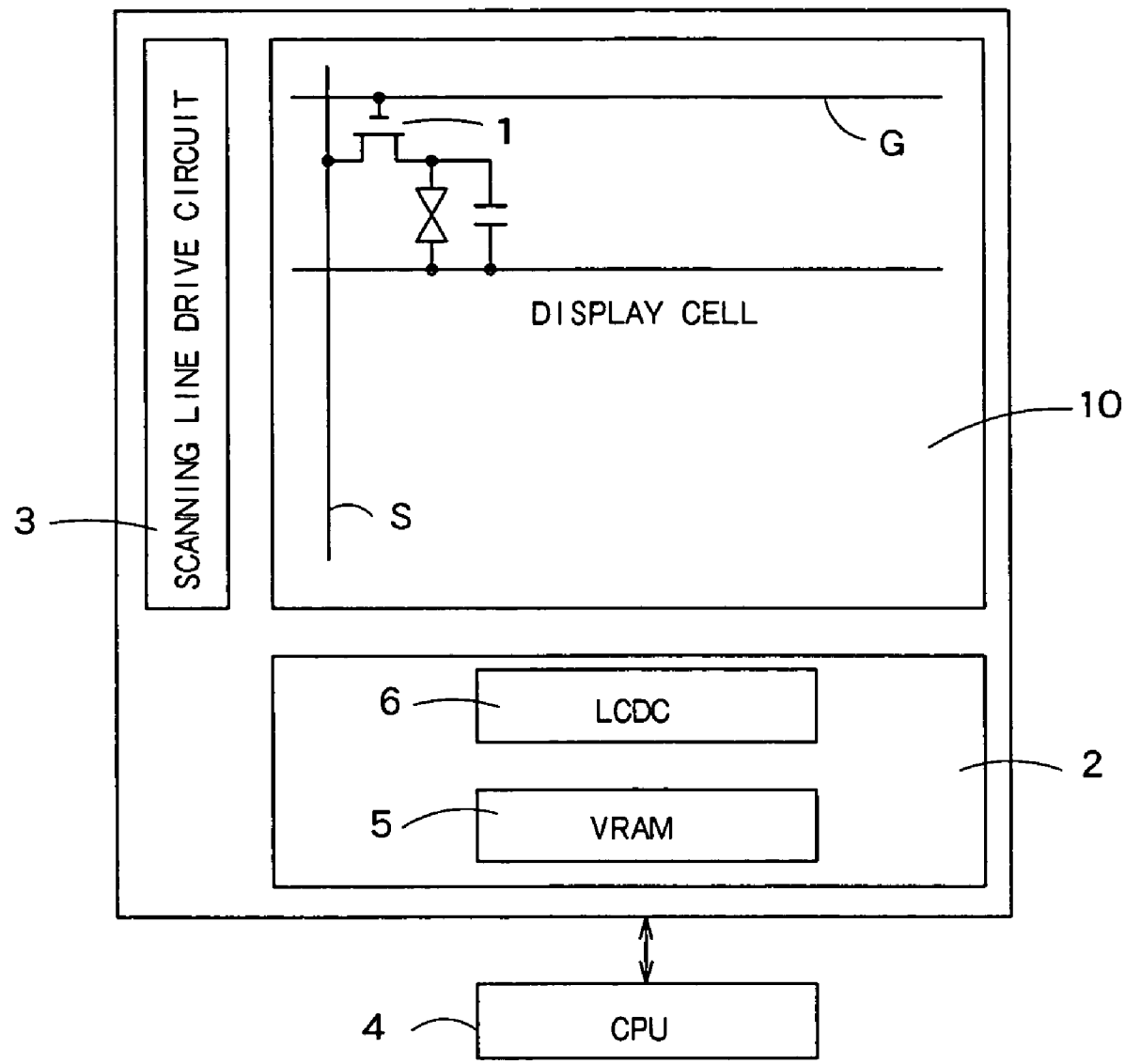
F I G. 1

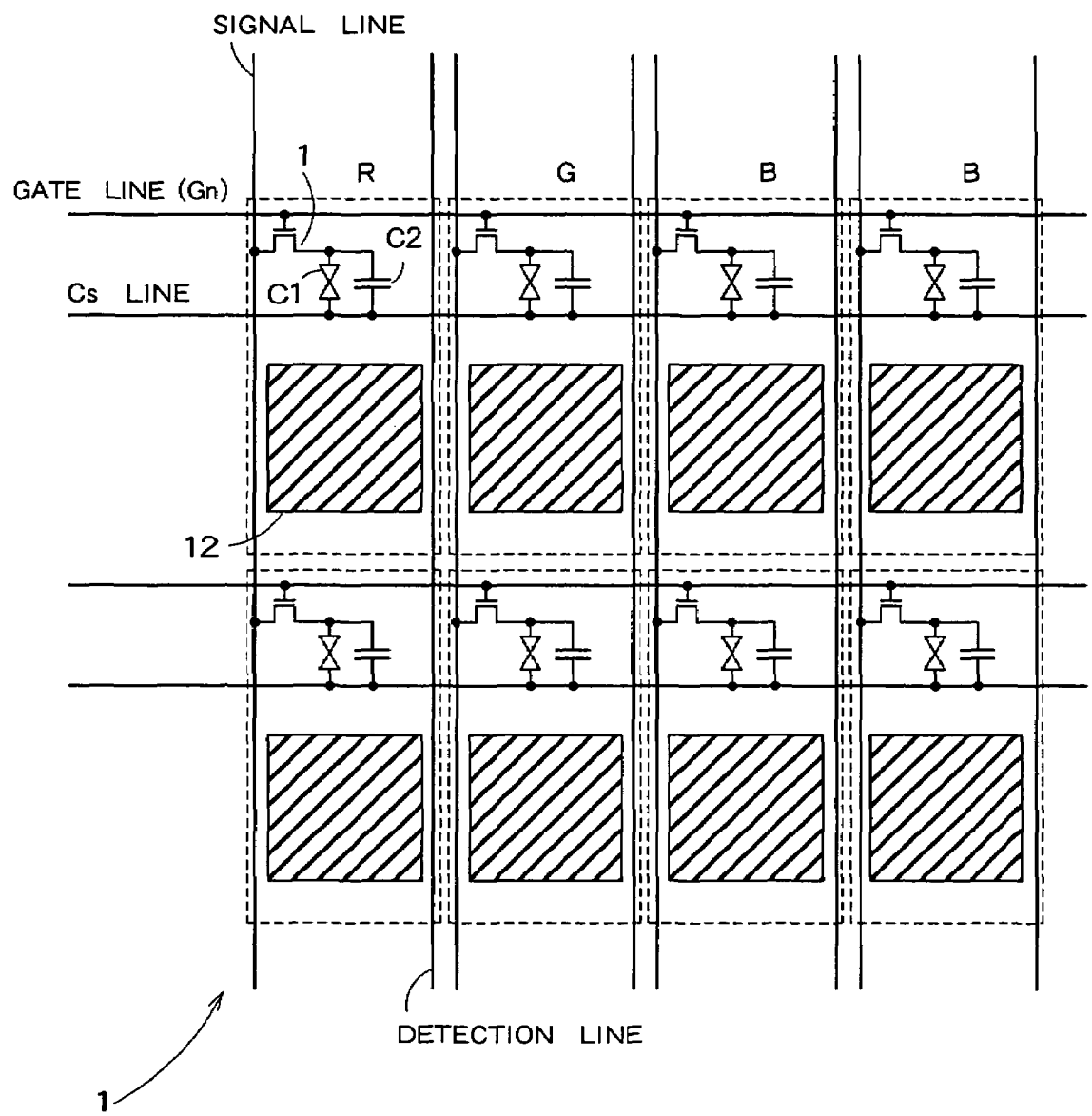
F I G. 2

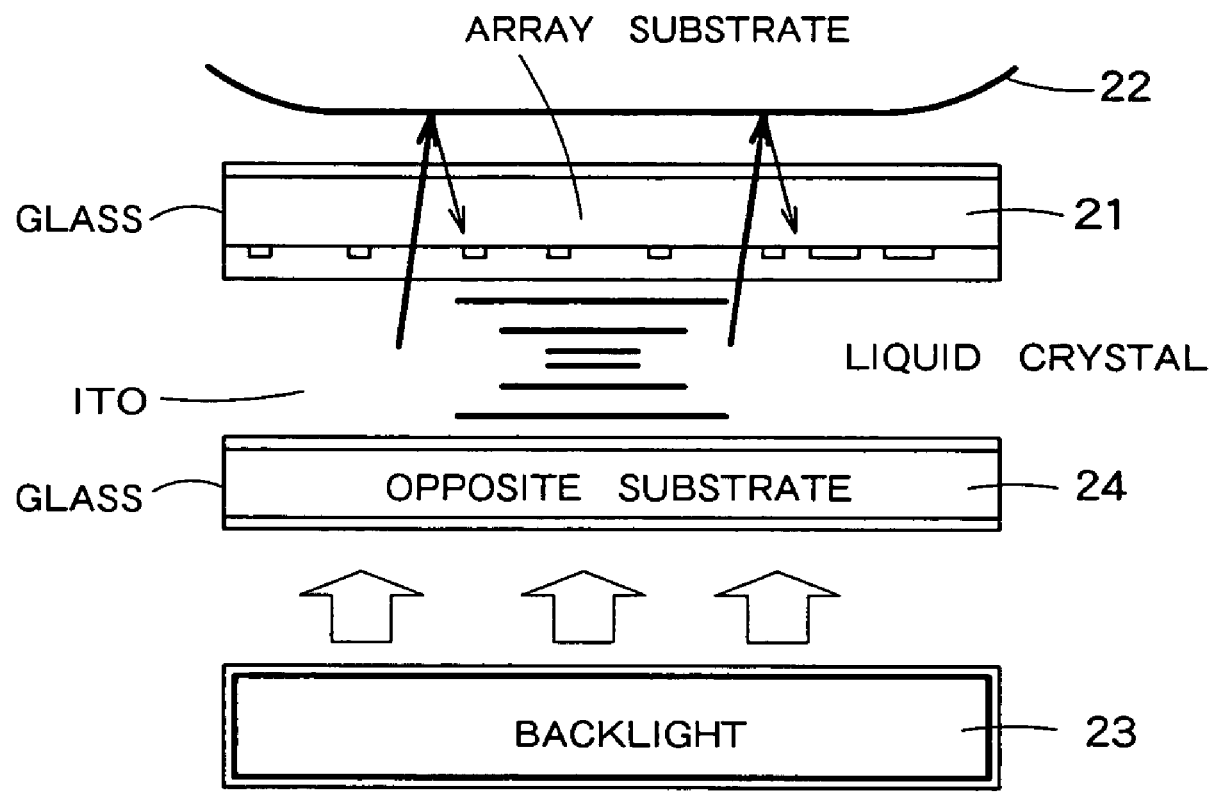
F I G. 5

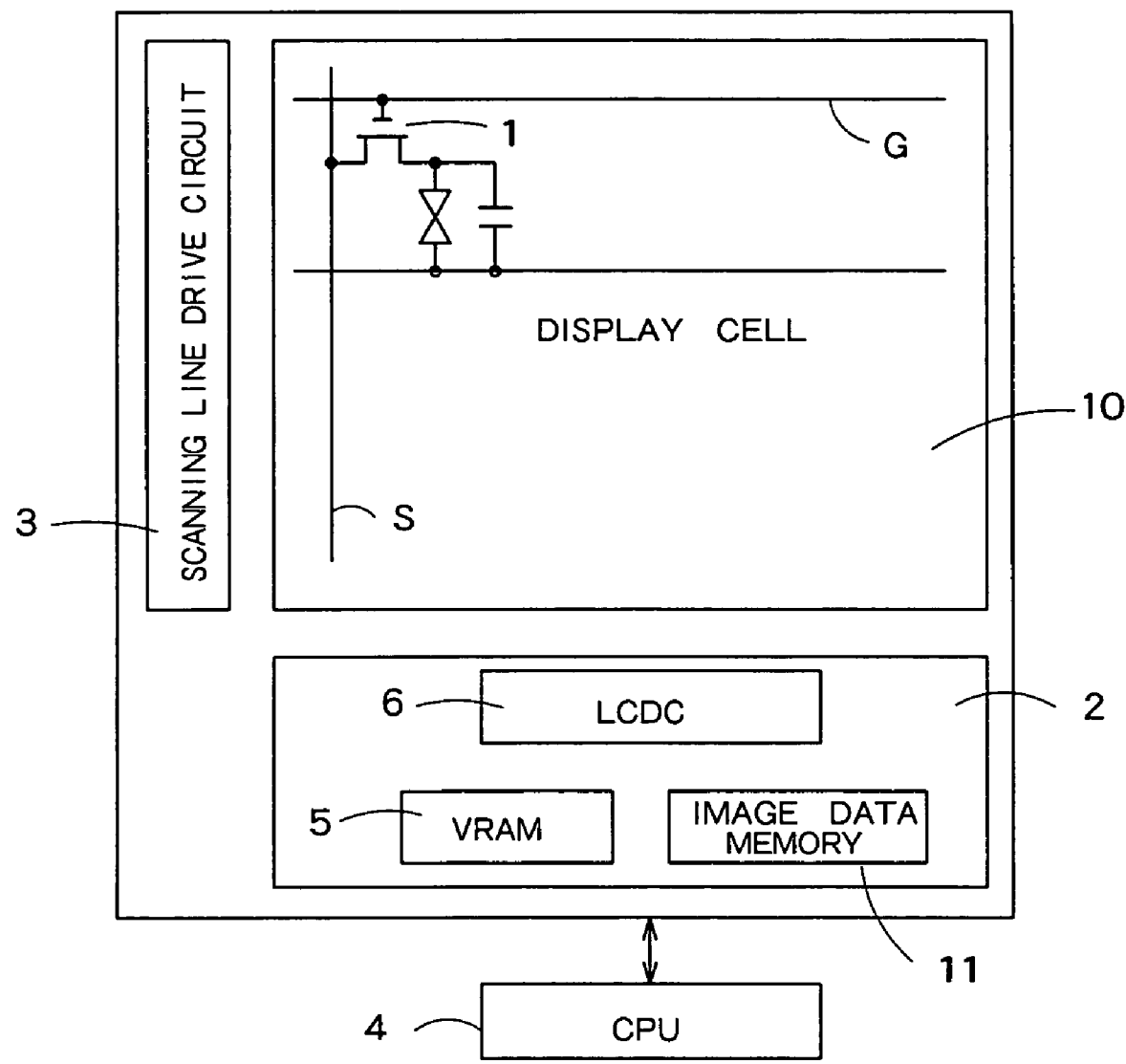
F I G. 9

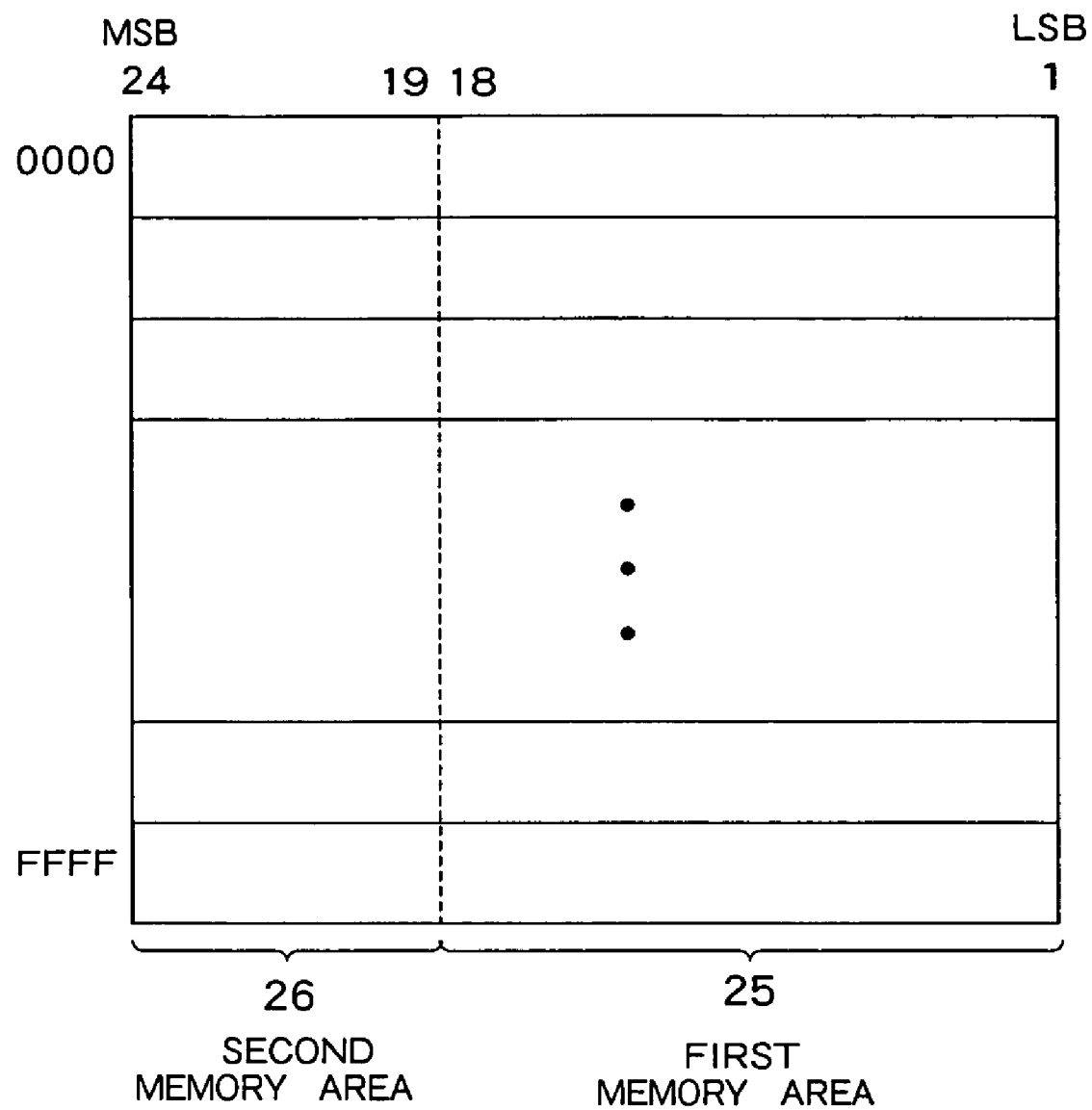
F I G. 10

DISPLAY DEVICE

CROSS REFERENCE TO RELATED APPLICATIONS

This application claims benefit of priority under 35 USC §119 to Japanese Patent Application No. 2003-176762, filed on Jun. 20, 2003, the entire contents of which are incorporated by reference herein.

BACKGROUND OF THE INVENTION

1. Field of the Invention

The present invention relates to a display device having a display data storage which stores ordinary display data and is implemented on an insulating substrate.

2. Related Background Art

Most of conventional liquid crystal displays control display of a LCD panel based on a control chip called an LCDC (Liquid Crystal Display Controller) (see Japanese Patent Laid-open Pub. No. 196732/2002).

FIG. 11 is a block diagram showing schematic configurations of this kind of a conventional liquid crystal display. As shown in FIG. 11, separately from a source driver 31 for driving signal lines formed on a glass substrate 30, the LCDC 32 and a CPU 33 have been conventionally disposed outside of the glass substrate 30. The LCDC 32 has supplied display image data to the source driver 31 on the glass substrate 30 in accordance with instructions of the CPU33.

If the LCDC 32 is disposed separately from the glass substrate 30, a distance from the LCDC 32 to display elements becomes long, and there are problems in which wiring load increases and power consumption is deteriorated.

Because of this, as shown in FIG. 12, there has been proposed a method of implementing the LCDC 32 on the glass substrate 30 by using an implementation method such as a COG (Chip On Glass). By embedding a memory storing the display data in the LCDC 32, it is possible to speed up readout speed of display data and to reduce power consumption.

In the liquid crystal display of FIG. 12, the LCDC 32 performs most of display control processing. Because of this, chip size of the LCDC 32 becomes large, and cost increases. As display resolution becomes high, the number of terminals of the LCDC 32 increases, thereby increasing implementation area of an LCDC chip. Furthermore, picture size of the LCD panel increases, and reliability at connection time deteriorates.

BRIEF SUMMARY OF THE INVENTION

In order to solve the above-described problem, an object of the present invention is to provide a display device capable of reducing power consumption and decreasing cost.

According to one embodiment of the present invention, a display device, comprising:

signal lines and scanning lines arranged vertically and horizontally on an insulating substrate;

display elements formed in vicinity of the signal lines and the scanning lines on said insulating substrate;

a signal line drive circuit which drives the signal lines; and a scanning line drive circuit which drives the scanning lines, wherein said signal line drive circuit includes:

a display data storage implemented on said insulating substrate, which stores ordinary display data supplied from outside; and a signal driver formed of polysilicon process on said insulating substrate, which drives the signal lines based on the ordinary display data stored in said display data storage.

Furthermore, according to one embodiment of the present invention, a display device, comprising:

signal lines and scanning lines arranged vertically and horizontally on an insulating substrate;

display elements formed in vicinity of the signal lines and the scanning lines on said insulating substrate;

a signal line drive circuit which drives the signal lines; and a scanning line drive circuit which drives the scanning lines, image pickup units arranged on said insulating substrate corresponding to said display elements, each picking up an incident light within a predetermined range and outputting image pickup data; and a pixel storage implemented on said insulating substrate, which stores ordinary display data supplied from outside and the image pickup data by said image pickup units, wherein said signal line drive circuit drives the signal lines based on data stored in said pixel storage.

DRAWINGS

FIG. 1 is a block diagram showing schematic configuration of a display device according to a first embodiment of the present invention.

FIG. 2 is a block diagram showing one example of a detailed configuration of display cells 10.

FIG. 5 is a diagram explaining processing operation in the case of performing image acquisition.

FIG. 9 is a block diagram showing schematic configurations of a display device according to a third embodiment of the present invention.

FIG. 10 is a diagram explaining the memory area of the VRAM 5, and shows an example in which each address has 24 bits.

DETAILED DESCRIPTION OF THE INVENTION

Hereafter, a receiver and a receiving method according to the present invention will be described more specifically with reference to the drawings.

FIRST EMBODIMENT

FIG. 1 is a block diagram showing schematic configuration of a display device according to a first embodiment of the present invention. The display device of FIG. 1 has signal lines S and scanning lines G arranged vertically and horizontally on the glass substrate 30, display elements 1 formed in vicinity of cross points of the signal lines S and the scanning lines G on the glass substrate 30, a signal line drive circuit 2 which drives the signal lines, and a scanning line drive circuit 3 which drives the scanning lines.

The signal line drive circuit 2 has a VRAM 5 which stores ordinary display data supplied from the CPU 4 provided on a substrate different from the glass substrate 30, and an LCDC 6 which drives the signal lines based on the ordinary display data stored in the VRAM 5.

The LCDC 6 according to the present embodiment does not have a display memory, different from the conventional LCDC 32 shown in FIG. 10. However, the LCDC 6 has a function of a source driver.

The display elements 1 and the LCDC 6 are formed on the glass substrate 30 by polysilicon process. On the other hand, the VRAM 5 is a chip which is formed by ordinary monosilicon process and implemented on the glass substrate 30. The scanning line drive circuit 3 is also formed on the glass substrate 30 by polysilicon process.

The polysilicon TFT (Thin Film Transistor) formed of the polysilicon process has a large element size, and operational speed of the polysilicon TFT is not fast, as compared with a monosilicon transistor formed of the monosilicon process. The polysilicon TFT can be formed on the glass substrate 30 by using the same fabrication process as that of the display elements, thereby simplifying the fabrication process, and improving fabrication yield. Furthermore, it is possible to reduce the number of wiring patterns and to decrease wiring resistors, thereby reducing power consumption and improving display quality.

In the present embodiment, the VRAM 5 requiring broad element forming area is implemented on the glass substrate 30 by using a general-purpose memory chip, without using the polysilicon process. By using such a general-purpose memory chip, it is possible to reduce cost of the implemented components.

Since the VRAM 5 of the present embodiment can operate at higher speed than the polysilicon TFT formed of the polysilicon process, it is possible to perform data transmission for the CPU 4 at high speed.

The LCDC 6 performs parallel data processing for the ordinary display data read out from the VRAM 5, and reduces operational frequency. More specifically, the LCDC 6 lowers drive frequency of the signal lines by driving a plurality of signal lines at the same time.

Figure 11:
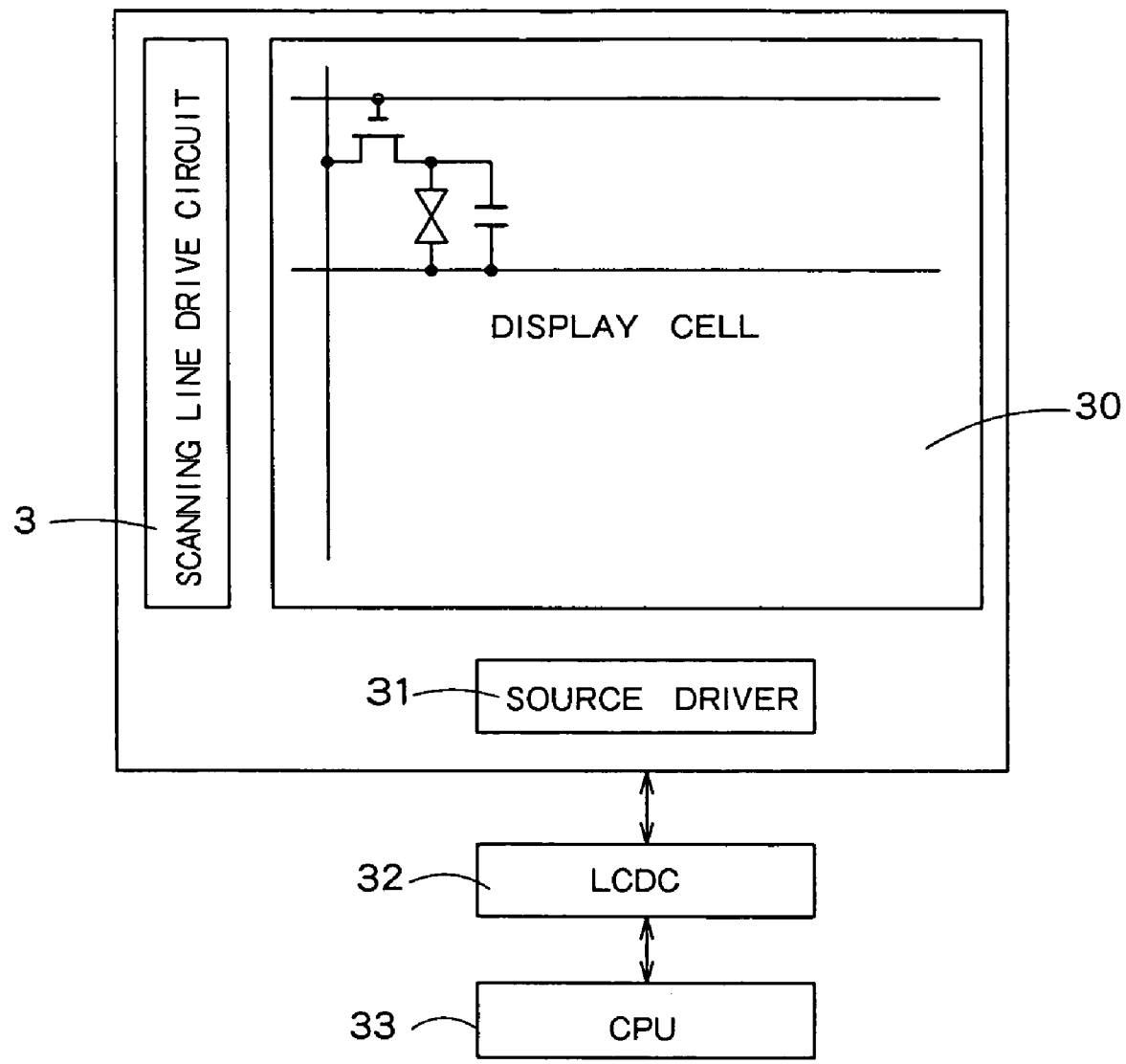
FIG. 11 is a block diagram showing schematic configurations of this kind of a conventional liquid crystal display.
Figure 12:
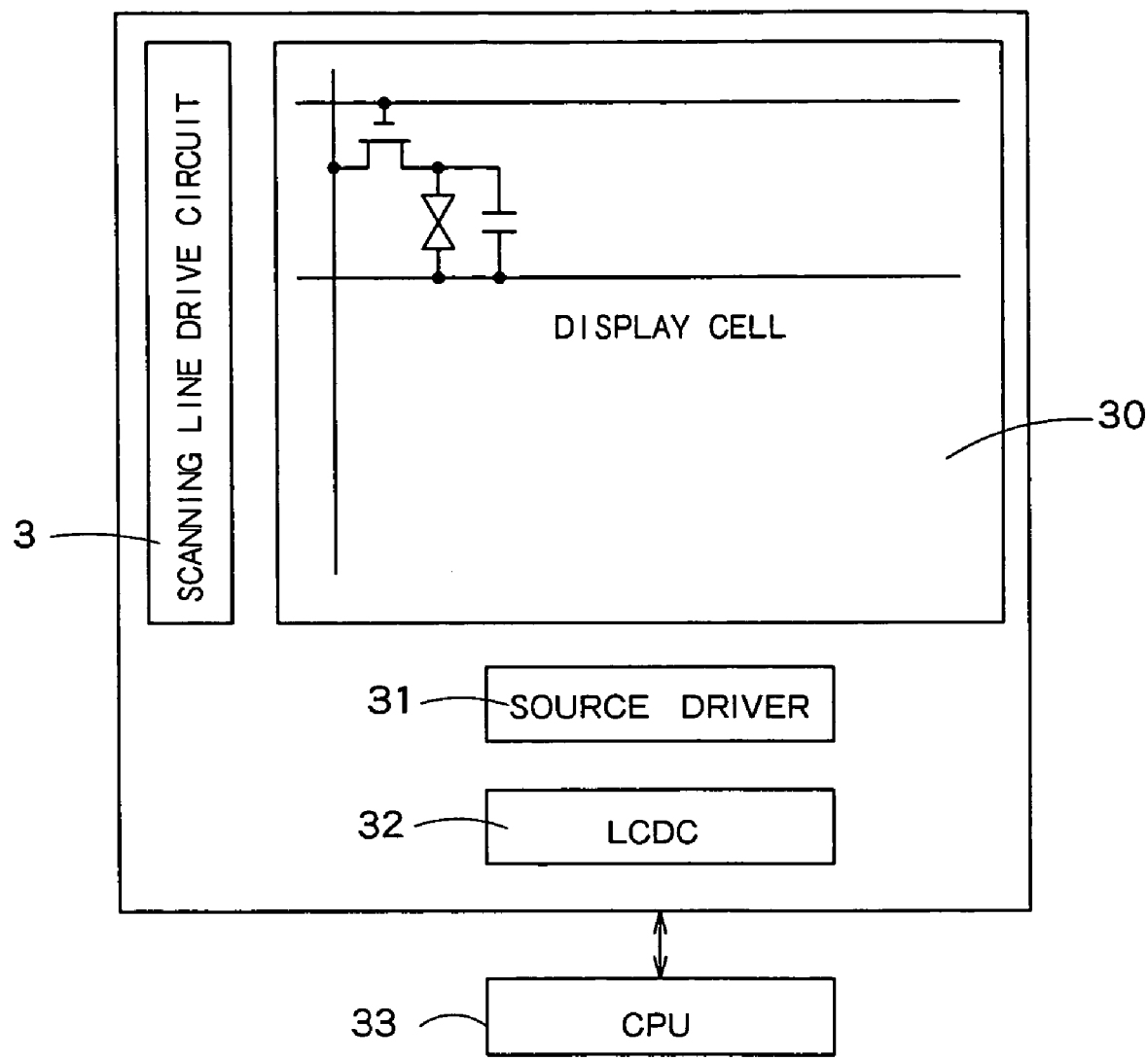
FIG. 12 is a block diagram of a conventional liquid crystal display implementing the LCDC on the glass substrate.

The LCDC 6 of FIG. 1 has functions of the source driver 31 in FIG. 11, and converts the parallel ordinary display data into analog signals by using a DAC not shown to drive the signal lines. By converting the ordinary display data into the analog signals by the LCDC 6, it is possible to simplify the signal processing on the glass substrate. Therefore, it is possible to lower element performance required to the polysilicon circuit.

On the other hand, when the drive voltage of the liquid crystal is high as many as about 4V, and the LCDC 6 has to be fabricated with fabrication process using high withstand voltage, chip cost increases. In this case, there may be a means for generating the analog output signal by a voltage capable of being outputted by the LCDC 6, for example at 2.5V, and for amplifying the signal by the polysilicon circuit on the glass substrate.

Furthermore, the LCDC 6 may have a function for outputting the digital image signal, and the DAC circuit not shown may be formed of the polysilicon process on the glass substrate.

As mentioned above, according to the first embodiment, the VRAM 5 formed of the monosilicon process is implemented on the glass substrate 30. Because of this, it is possible to speed up data transmission between the CPU 4 and the VRAM 5, and it is unnecessary to use high withstand voltage process. Moreover, as a signal transmission method, a widely used procedure, such as data transfer procedure of a random access memory can be used. That is, it is possible to use ordinary signal transmission method. Consequently, the general-purpose memory chip can be used as the VRAM 5, thereby reducing cost.

Furthermore, because the LCDC 6 is formed of the polysilicon process, it is possible to reduce the wiring resistor between the LCDC 6 and the display elements 1, and also reducing the wiring load, thereby driving the signal lines with low power consumption.

SECOND EMBODIMENT

A second embodiment aims at a display device having image acquisition function, and reduces the amount of the memory for storing the ordinary display data.

A display device according to the second embodiment has the same block configurations as those of FIG. 1. FIG. 2 is a block diagram showing one example of a detailed configuration of display cells 10. Each area enclosed by a dotted line of FIG. 2 expresses configuration of one pixel.

Each pixel has a display element 1, a liquid capacitor C1 and a supplementary capacitor C2 connected to one end of the display element 1, and a sensor 12 for image acquisition. The sensor 12 is connected to a power supply line and a control line not shown.

In FIG. 2, only one display element 1 is shown in one pixel. Practically, there are three display elements 1 for red, green and blue. Each display element 1 has one sensor 12.

Figure 3:
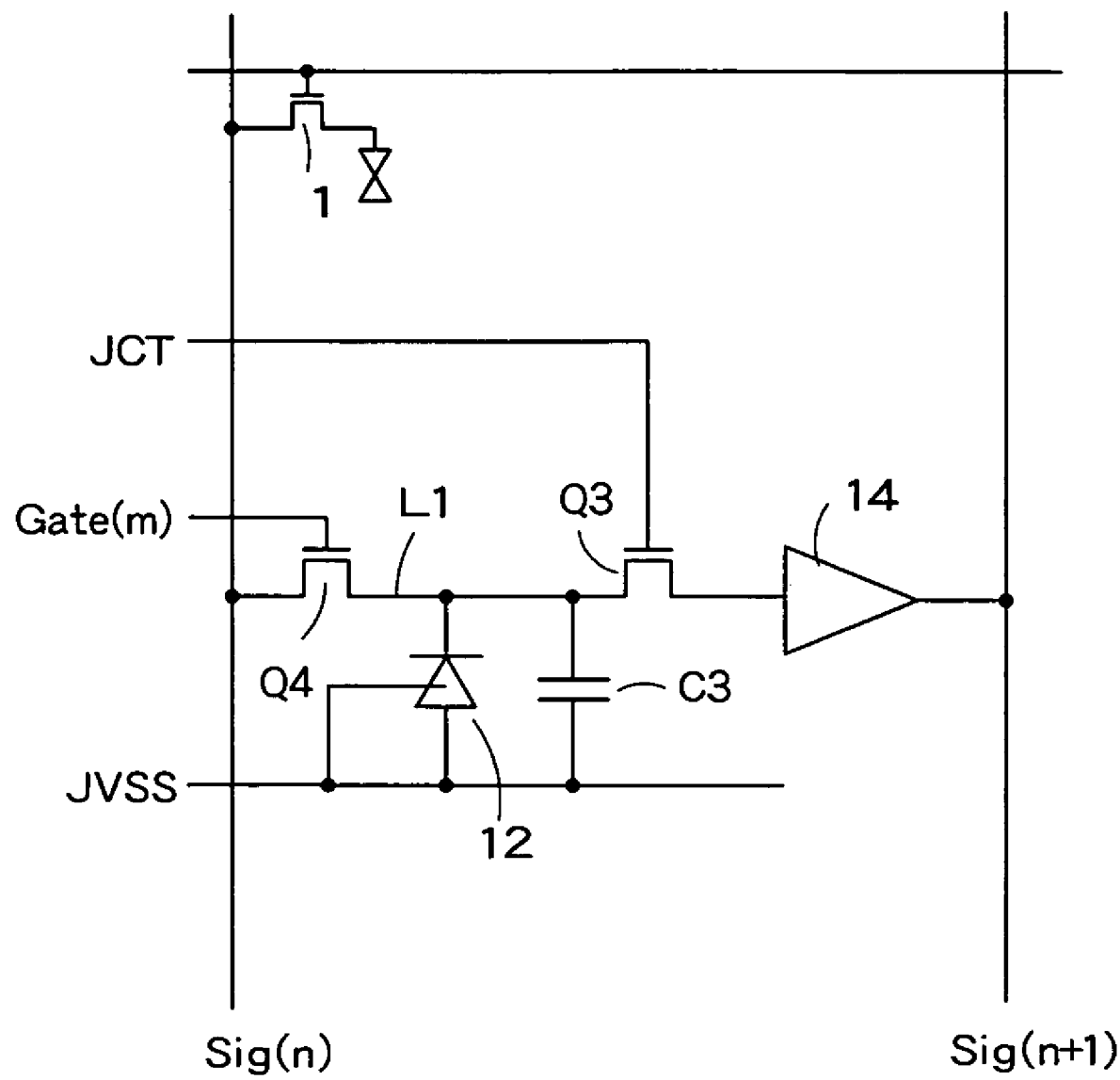
FIG. 3 is a circuit diagram showing a detailed configuration for one pixel.

FIG. 3 is a circuit diagram showing a detailed configuration for one pixel. One sensor 12 having a photo diode is provided corresponding to each display element 1 in one pixel. An anode terminal of the sensor 12 is connected to the power supply line JVSS, and a cathode terminal thereof is connected to a control line L1. These may be formed on the same substrate (array substrate), or a portion thereof may be provided on an opposite substrate. For example, the display elements 1 may be disposed on the opposite substrate. In this case, the signal lines and the scanning lines are provided also on the opposite substrate. When the pixel TFTs and the sensor circuit are formed on the same substrate, it is possible to reduce fabrication cost. When the pixel TFTs and the sensor circuit are formed on the substrates different from each other, aperture ration can be increased, thereby reducing power consumption of a backlight. For example, the pixel TFTs on the opposite substrate are arranged opposite the sensors and the capacitors on the array substrate.

Furthermore, Each pixel has a capacitor C3 connected between the power supply line JVSS and the control line L1, a transistor Q3 which control the VRAM 5 shown in FIG. 1 to store binary data in accordance with an accumulated electric charge of the capacitor C3, a reset transistor Q4 for initializing the VRAM 5 and the capacitor 3, and an amplifier (AMP) 14 for amplifying the accumulated electric charge of the capacitor C3.

The second embodiment has a feature in that the VRAM 5 is used as a memory for storing image pickup data picked up by the sensor 12. A dedicated memory for the image pickup data becomes unnecessary by using the VRAM 5, thereby reducing cost and implementation area.

Figure 4:
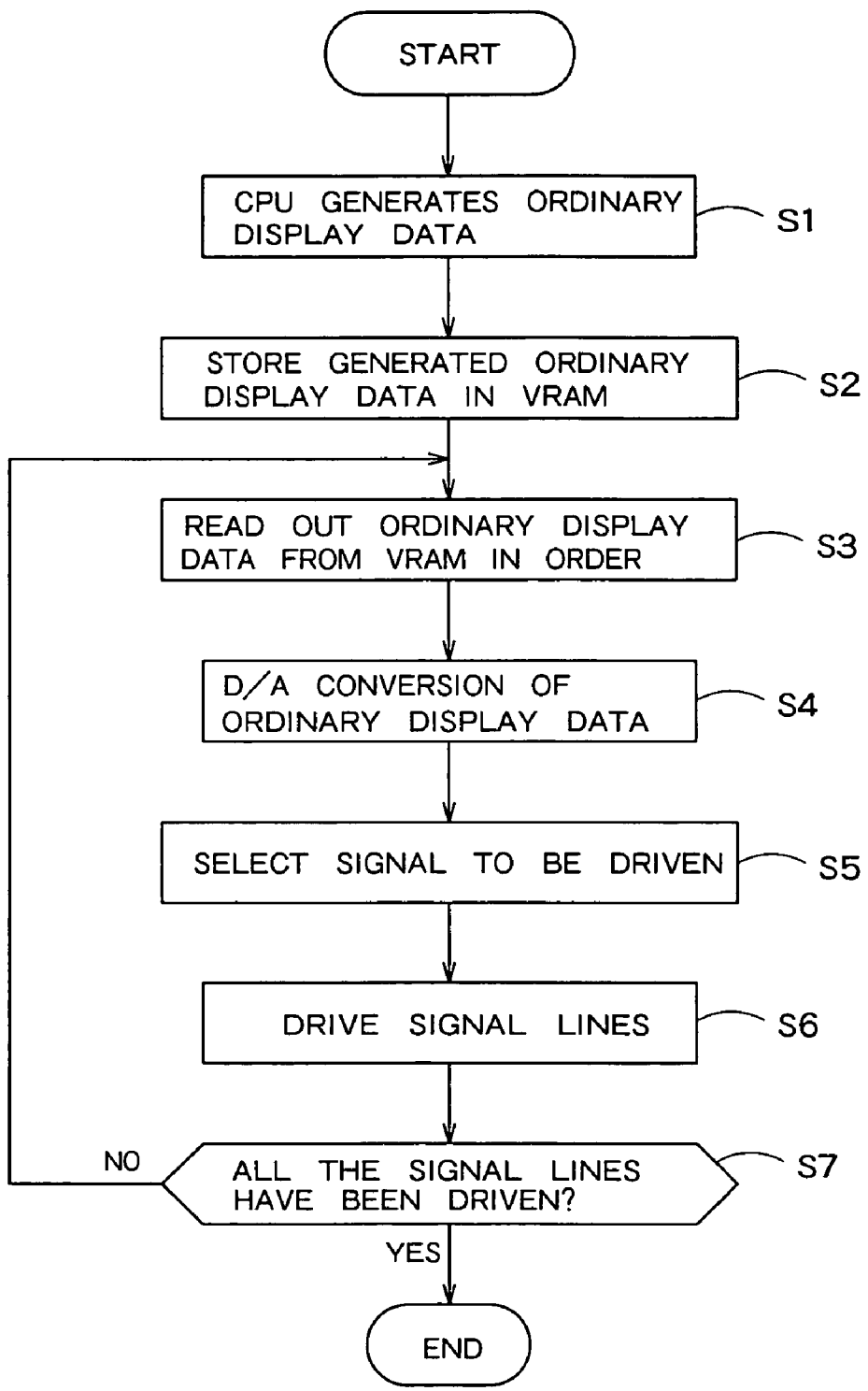
FIG. 4 is a flowchart showing ordinary display operation.

The display device according to the present embodiment can perform ordinary display operation and image acquisition similar to a scanner. FIG. 4 is a flowchart showing ordinary display operation.

First of all, the CPU 4 generates ordinary display data by performing image operation processing (step S1), and stores the generated ordinary display data into the VRAM 5 (step S2). Next, the LCDC 6 reads out the ordinary display data from the VRAM 5 in order (step S3), and performs D/A conversion (step S4).

Next, the LCDC 6 selects the signal line to be driven (step S5), and drives the selected signal line by using the source driver in the LCDC 6 (step S6). Next, it is determined whether or not drive of all the signal lines has been completed (step S7). If not completed yet, the processing of step S3 is performed. If completed, the processings of FIG. 4 is finished.

When performing ordinary display operation, the transistor Q3 of FIG. 3 is set to off state, and valid data is not stored in the VRAM 5. In this case, a signal voltage from the signal line drive circuit 22 is supplied to the signal lines, and display is conducted in accordance with the signal line voltage.

On the other hand, when performing the image acquisition, an image acquisition object (for example, a sheet) 22 is disposed on upper face of the array substrate 21, as shown in FIG. 5. A light from the back light 23 is illuminated on the sheet 22 through the opposite substrate 24 and the array substrate 21. The light reflected by the sheet 22 is received by the sensor 12 on the array substrate 12, and the image is acquired.

The acquired image pickup data is stored in the VRAM 5 via a detection line. The LCDC 6 performs arithmetic operation processings such as sorting of data stored in the VRAM 5 and elimination of noise in data.

Figure 6:
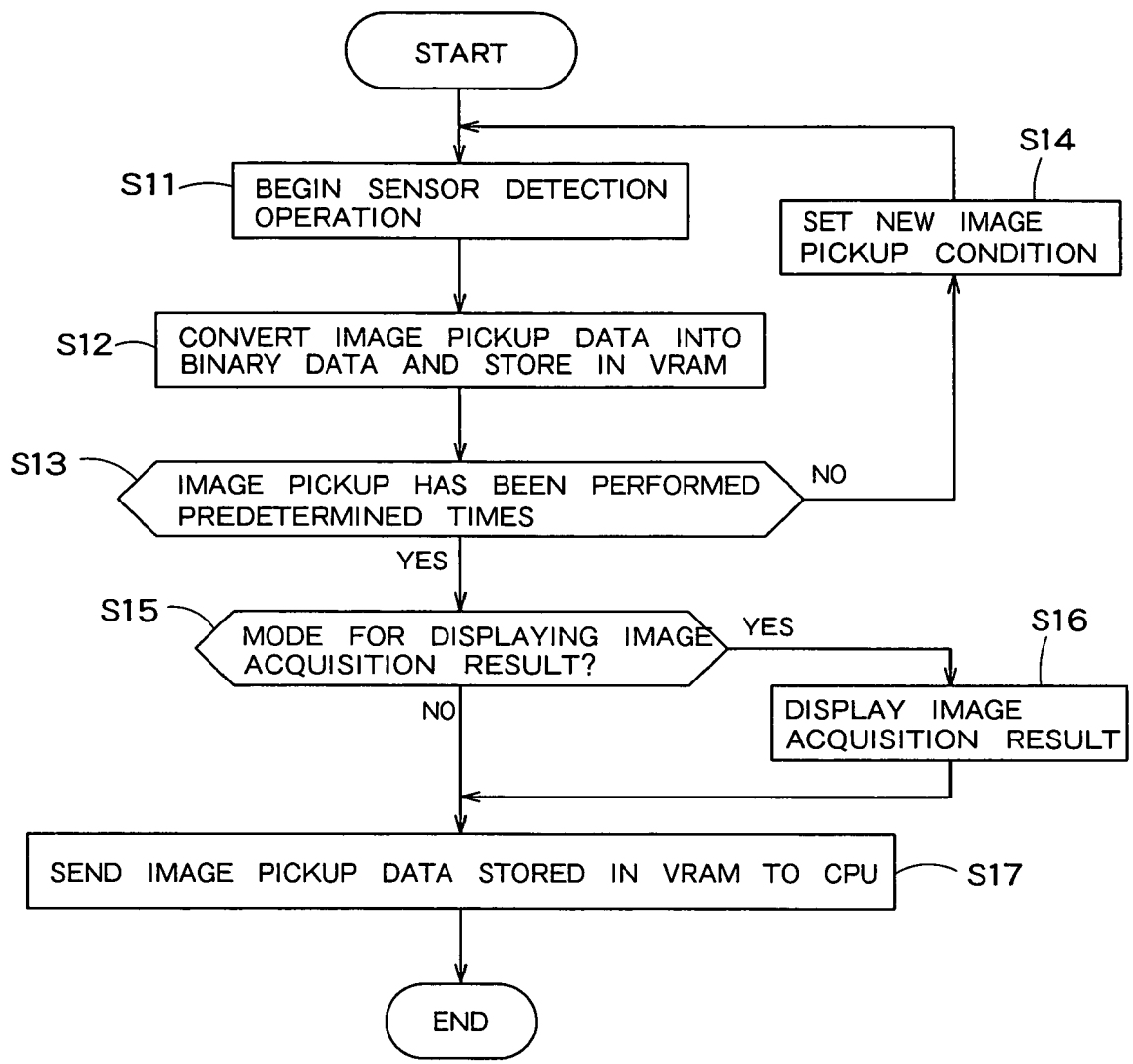
FIG. 6 is a flowchart showing processing operation in the case of image acquisition.

FIG. 6 is a flowchart showing processing operation in the case of image acquisition. First of all, the CPU 4 begins detection operation of the sensor 12 (step S11). The image pickup data picked up by the sensor 12 is converted into binary data and stored in the VRAM 5 (step S12).

It is determined whether or not image pickup has been conducted predetermined times while changing image pickup conditions (step S13). If not reached the predetermined times, a new image pickup condition is set (step S14), and the processings of step S11 or later are repeated.

Here, an individual image pickup condition means the case where the voltage applied to the capacitor C3 is different. When the sensor 12 picks up a whitish portion of the image pickup object, the initial electric charge of the capacitor is discharged, and a voltage at both ends of the capacitor C3 lowers. On the other hand, when the sensor 12 picks up a blackish portion of the image pickup object, the current does not flow through the sensor 12, and the voltage at both ends of the capacitor C3 does not almost change. It is possible to detect dark and light of the image pickup object by controlling the voltage applied to the capacitor C3 in advance.

An integrated value of a plurality of image pickup data picked up under a plurality of image pickup conditions different from each other is stored in a memory area corresponding to a certain address of the VRAM 5. In this way, by integrating a plurality of image pickup data picked up under a plurality of image pickup conditions, it is possible to express gradation.

When it is determined to have conducted sampling predetermined times in step S13, it is determined whether or not a mode for displaying image acquisition result is selected (step S15). If the mode is selected, the same processing as that of FIG. 4 is performed to display image acquisition result (step S16).

Here, when the image pickup data by the sensor 12 is displayed as it is, right and left are inverted and displayed, similarly to a mirror. Such an inversion image may be displayed in order picked up by the sensor 12.

On the other hand, when it is necessary to display a non-inverted image, such as the case of picking up image by using an ordinary camera, the image may be displayed in an order contrary to the order picked up by the sensor 12. Because of this, data read out from the VRAM 5 may be sorted, and written to the signal line. Alternatively, taking the order read out from the VRAM 5 into consideration, the image pickup data from the sensor 12 may be written in the VRAM 5. In the latter case, the sorting of the image pickup data is unnecessary, thereby reducing processing load of the LCDC 6.

On the other hand, when determined not to be the mode for displaying the image acquisition result, or when determined that the processing of step S15 has been finished, the image pickup data stored in he VRAM 5 is sent to the CPU 4 (step S17).

Figure 7:
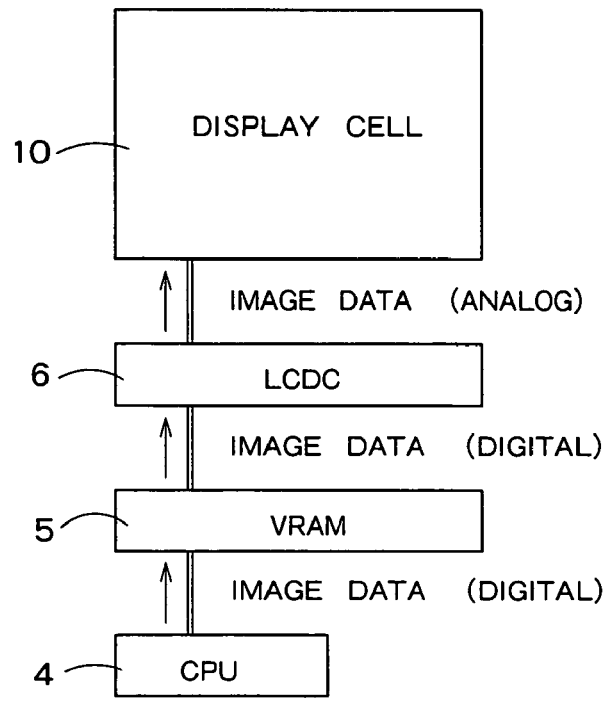
FIG. 7 is a diagram showing data flow in the case of performing the ordinary display operation.

FIG. 7 is a diagram showing data flow in the case of performing the ordinary display operation. Digital ordinary display data from the CPU 4 is stored into the VRAM 5 implemented on the glass substrate 30. The LCDC 6 converts the ordinary display data read out from the VRAM 5 into the analog signal, and writes it into the signal lines.

Figure 8:
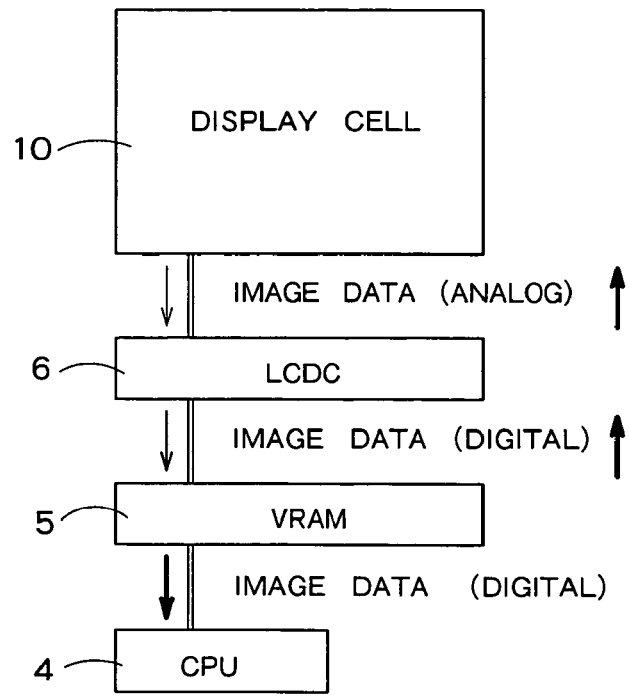
FIG. 8 is a diagram showing data flow in the case of the image acquisition.

FIG. 8 is a diagram showing data flow in the case of the image acquisition. The image pickup data picked out by the sensors 12 in the display cells 10 is inputted to the LCDC 6. The LCDC 6 sorts the image pickup data corresponding to a display format, and designates an address for each image pickup data to write it into the VRAM 5. The CPU 4 reads out the image pickup data written into the VRAM 5 if necessary.

On the other hand, when the image pickup data is displayed in the display cell 10, the LCDC 6 reads out the image pickup data from the VRAM 5, and converts it into analog signals to write it into the signal lines.

As mentioned above, according to the second embodiment, because the image pickup data picked up by the sensor 12 is stored in the VRAM 5, a dedicated memory for the image pickup data is unnecessary, thereby reducing cost. It is unnecessary to provide a dedicated memory for the image pickup data in the display cell 10, thereby improving aperture ratio.

THIRD EMBODIMENT

A third embodiment provides a image pickup data memory for storing image pickup data, separately from the VRAM 5 for storing ordinary display data supplied from outside.

FIG. 9 is a block diagram showing schematic configurations of a display device according to a third embodiment of the present invention. In FIG. 9, the same symbols are attached to constituents common to FIG. 1. Hereinafter, different points will be mainly described.

A signal line drive circuit in the display device of FIG. 9 has an image pickup data memory 11 which stores image pickup data, in addition to configurations of FIG. 1. The image pickup data memory 11 is consisted of an IC chip separate from the VRAM 5, and implemented on the glass substrate. The IC chip composing of the image pickup data memory 11 is formed of ordinary monosilicon process.

As shown in FIG. 1, when the VRAM 5 is shared with the ordinary display data and the image pickup data, the ordinary display data and the image pickup data have to share also a bus wiring. Because of this, so that both data does not conflict on the bus wiring, it is necessary to provide a circuit for switching whether or not to supply each data on the bus wiring, thereby complicating the whole circuit.

On the other hand, as shown in FIG. 9, if the image pickup data memory 11 is provided separately from the VRAM 5, it is unnecessary to share the bus wiring, thereby simplifying a circuit for controlling timing of the ordinary display data and the image pickup data.

As mentioned above, according to the third embodiment, because the image pickup data memory 11 is provided separately from the VRAM 5, it is possible to simplify the circuit for controlling read/write data for the VRAM 5 and the image pickup data memory 11.

FOURTH EMBODIMENT

A fourth embodiment is a modified example of the second embodiment. In the fourth embodiment, memory area of the VRAM 5 is divided into two, the ordinary display data is stored in one memory area, and the image pickup data is stored in another memory area.

The display device according to the fourth embodiment of the present invention has the same block configurations as those of FIG. 1. The ordinary display data and the image pickup data are stored in the VRAM 5.

FIG. 10 is a diagram explaining the memory area of the VRAM 5, and shows an example in which each address has 24 bits. The VRAM 5 of FIG. 10 has a first memory area 25 storing the ordinary display data, and the second memory area 26 storing the image pickup data. The first memory area 25 is a memory area storing data from a least significant bit to 18th bit. The second memory area 26 is a memory area storing data from 19th bit to a most significant bit.

Data having each 6 bits of RGB (total 18 bits) is stored in the first memory area 25. Because of this, display of 256 gradations with respect to each color is possible. Data having each 2 bits of RGB (total 6 bits) is stored in the second memory area 26.

The ordinary display data and the image pickup data corresponding to the same pixel are stored in the first and second memory areas 25 and 26 having the same addresses in the VRAM 5. While picking up the images, the image corresponding to the ordinary display data stored in the first memory area 25 is displayed on a display screen.

When the image pickup for one frame is finished, the CPU 4 reads the image pickup data for one frame stored in the second memory area 26 in the VRAM 5 to perform a prescribed image processing, and extends the data into gradation data for each 8 bits with respect to each color. After then, the CPU 4 writes the extended respective 8 bits data (total 24 bits) into the VRAM 5. Therefore, the image pickup data having each 8 bits with respect to each color is displayed on the display screen.

As mentioned above, according to the fourth embodiment, the ordinary display data and the image pickup data of the same pixel are stored in the same address area of the VRAM 5. Because of this, it is unnecessary to separately issue the addresses for each data, and it is possible to simplify the configurations of the control circuit for controlling read/write for the VRAM 5. Furthermore, after performing image processing of the image pickup data, it is possible to use all the memory area of the VRAM 5 to display the image pickup data, thereby displaying the image pickup data of high quality.

What is claimed is:

1. A display device, comprising:
    signal lines and scanning lines arranged vertically and horizontally on an insulating substrate;
    display elements formed in vicinity of the signal lines and the scanning lines on said insulating substrate;
    a signal line drive circuit which drives the signal lines;
    a scanning line drive circuit which drives the scanning lines;
    image pickup units arranged on said insulating substrate corresponding to said display elements, each picking up an incident light within a predetermined range and outputting image pickup data; output and
    a pixel storage implemented on said insulating substrate, which stores ordinary display data supplied from outside and the image pickup data by said image pickup units,
    wherein said signal line drive circuit drives the signal lines based on data stored in said pixel storage.

2. The display device according to claim 1, further comprising a sorting circuit which sorts the image pickup data picked up by said image pickup unit,
    wherein said pixel storage stores the image pickup data sorted by said sorting circuit.

3. The display device according to claim 1, wherein said pixel storage stores the image pickup data obtained by integrating a plurality of image pickup data picked up by said image pickup units under a plurality of image pickup conditions different from each other.

4. The display device according to claim 1, wherein said pixel storage has a first memory area which stores ordinary display data and a second memory area which stores the image pickup data.

5. The display device according to claim 4, wherein one of said first and second memory areas is a memory area from a least significant bit to nth bit among all the memory areas, where n is an integer not smaller than the least significant bit, and not larger than a most significant bit, and another of said first and second memory areas is a memory area from (n+1)th bit to the most significant bit.

6. The display device according to claim 5, wherein the ordinary display data and the image pickup data corresponding to the same pixel are stored in said first and second memory areas of a same address in said storage.

7. The display device according to claim 1,
    wherein said display data storage is formed of monosilicon process; and
    said display elements and said signal line drive unit are formed of TFTs (Thin Film Transistor) made of polysilicon on said insulating substrate.

\* \* \* \* \*